July 28, 1959

H. VERMETTE 2,896,957

DRILL CHUCK WITH SPRING-LOADED COLLET

Original Filed April 2, 1957

INVENTOR.
HOWARD VERMETTE
BY
Harry H. Hitzeman
ATTORNEY

United States Patent Office 2,896,957
Patented July 28, 1959

---

2,896,957

DRILL CHUCK WITH SPRING-LOADED COLLET

Howard Vermette, Hammond, Ind.

Original application April 2, 1957, Serial No. 650,234, now Patent No. 2,855,207, dated October 7, 1958. Divided and this application January 24, 1958, Serial No. 711,005

12 Claims. (Cl. 279—58)

My invention relates to improvements in drill chuck construction, and generally to that type of drill chuck or work holder construction which has work holding surfaces and adjusting means for moving said surfaces to a work holding position.

The principal object of the present invention is to provide a drill chuck having movable work holding surfaces, adjusting means for moving the same, and spring mechanism associated therewith in such manner that through the spring action a pounding or hammer action is obtained to loosen the hold of the work holding surfaces on a drill bit or other tool being held therebetween.

This application is a division of my co-pending application for patent on improvements in "Chuck Construction," Serial No. 650,234, filed April 2, 1957, now Patent No. 2,855,207.

Figure 1:
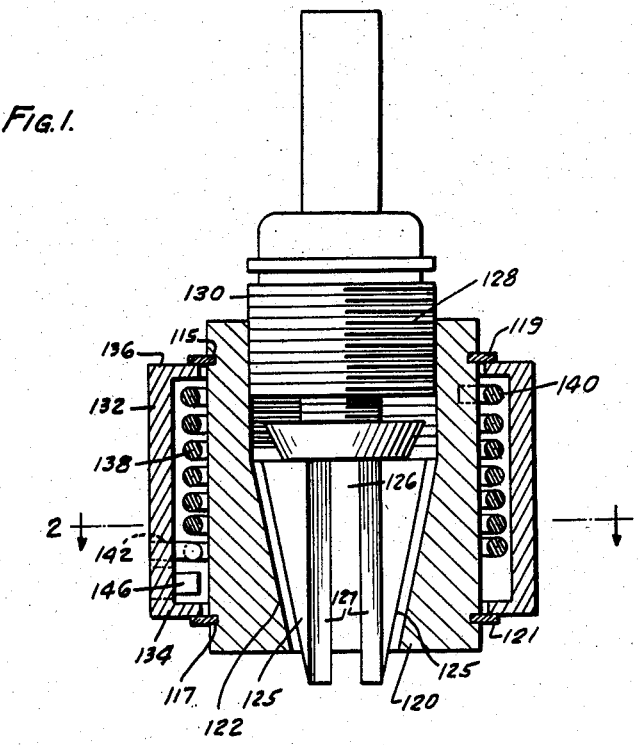
Figure 2:
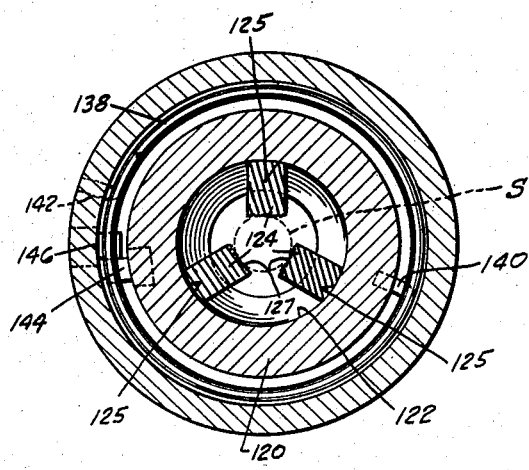

For a more comprehensive understanding of the construction above referred to and its operation, reference is had to the accompanying drawings, upon which:

Fig. 1 is a vertical sectional view of a drill chuck or collet embodying my invention; and Fig. 2 is a plan sectional view thereof taken on the line 2—2 of Fig. 1.

In Figs. 1 and 2, I have shown the usual type of drill chuck, wherein a chuck body 120 which has a tapered inner bore 122 receives therein a plurality of chuck jaws 124. These jaws are usually fastened at their top end in a holder 126 so that they are moved in an up and down direction simultaneously. The chuck jaws 124 may have tapered outer sides 125 and parallel work engaging surfaces 127 to grip the stem 5 of a drill bit or other work tool. The chuck body or collet 120 is tapped at 128 to receive the screw-threaded drive stem 130 which, as it is turned up or down in the tapped opening 128, opens or closes the jaws 124 of the drill chuck by movement of the outer sides 125 against the tapered inner bore 122.

Means for effecting a rotation of the collet or chuck body 120 includes a hand wheel or collar 132 in the shape of a cylindrical shell that has parallel upper and lower ledges 134 and 136 for enclosing a coiled spring 138, and is telescopically mounted around the chuck body 120. A pair of spring retainer rings 119 and 121 mounted in parallel grooves 117 and 115 adjacent the top and bottom of the chuck body hold the hand wheel on the chuck body.

One end 140 of the spring 138 may be fastened in the chuck body or collet 120 and then be coiled about the same within the hand wheel 132 and have its opposite end 142 fastened in the hand wheel 132. I provide a pair of engaging lugs or dogs 144 and 146, the dog 144 being mounted in the surface of the chuck body 120 and the dog 146 being mounted in the inner wall of the hand wheel 132.

Thus as shown in Fig. 2, when the hand wheel is turned clockwise to approximately 360° to create tension in the spring 138 and is then released, the hand wheel will swing around counter-clockwise and the hammer lug or dog 146 will strike the dog 144 with the impact of the centrifugal action, effecting a prompt loosening of the chuck body or collet on the drill chuck jaws, thereby quickly releasing drill bits or other tools that are being held therein.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. A drill chuck of the type having a collet and movable jaws therein, said collet capable of rotation to separate or bring said jaws together in a tool holding operation, and a hand wheel mounted on said collet, a spring motor connected between said hand wheel and collet and cooperating dogs on said hand wheel and collet for effecting a hammer action on said collet whenever said spring motor is loaded and released.

2. A drill chuck of the type having a cylindrical collet having a tapered axial bore and movable jaws therein, said collet capable of rotation to separate or bring said jaws together in a tool holding operation, and a hand wheel mounted on said collet, said hand wheel surrounding said collet and enclosing a coiled spring, one end of said spring connected to said collet and one end to said hand wheel, and cooperating dogs on said hand wheel and collet for effecting a hammer action on said collet whenever said spring is coiled and released.

3. A chuck of the type having a collet and movable jaws therein, said collet capable of rotation to separate or bring said jaws together in a tool holding operation, and a hand wheel mounted on said collet, a spring motor connected between said hand wheel and collet and cooperating dogs on said hand wheel and collet for effecting a hammer action on said collet whenever said spring motor is loaded and released.

4. A drill chuck comprising a cylindrical chuck body having a tapered inner bore, a jaw holder, a plurality of tapered jaws connected at their top end to said holder, said holder and jaws mounted in said tapered inner bore with the sides of said jaws against said tapered inner bore, a drive stem screw-threadedly mounted in a tapped bore in the top of said chuck body, said drive stem having a bottom shoulder engaging the top of said jaw holder to move said jaw holder and jaws down and together to grasp a drill bit when said chuck body is turned up on said drive stem, a cylindrical shell around said chuck body, and spring means in said shell for loosening said jaws from grasping said drill bit, said spring means coiled around said chuck body and having one end connected to said shell and the other end to said chuck body.

5. A drill chuck comprising a cylindrical chuck body having a tapered inner bore, a jaw holder, a plurality of tapered jaws connected at their top end to said holder, said holder and jaws mounted in said tapered inner bore with the sides of said jaws against said tapered inner bore, a drive stem screw-threadedly mounted in a tapped bore in the top of said chuck body, said drive stem having a bottom shoulder engaging the top of said jaw holder to move said jaw holder and jaws down and together to grasp a drill bit when said chuck body is turned up on said drive stem, and spring means for loosening said jaws from grasping said drill bit, said spring means including a hand wheel telescopically mounted on said chuck body, a coiled spring therein, one end fastened to said chuck body and one end fastened to said hand wheel and cooperating dogs on said hand wheel and said chuck body, said spring effecting a hammer blow therebetween whenever said spring is wound up and then released.

6. A drill chuck comprising a cylindrical chuck body having a tapered inner bore, a jaw holder, a plurality of tapered jaws connected at their top end to said holder, said holder and jaws mounted in said tapered inner bore with the sides of said jaws against said tapered inner bore, a drive stem screw-threadedly mounted in a tapped bore in the top of said chuck body, said drive stem having a bottom shoulder engaging the top of said jaw holder to move said jaw holder and jaws down and together to grasp a drill bit when said chuck body is turned up on said drive stem, and spring means for loosening said jaws from grasping said drill bit, said spring means including a hand wheel telescopically mounted on said chuck body and a coiled spring therein, one end fastened to said chuck body and one end fastened to said hand wheel, said hand wheel rotatable on said chuck body to load said spring and a hammer lug on said hand wheel and a dog on said chuck body, said hammer lug adapted to strike said dog when said rotated hand wheel is released.

7. A drill chuck comprising a cylindrical chuck body having a tapered inner bore, a jaw holder, a plurality of tapered jaws connected at their top end to said holder, said holder and jaws mounted in said tapered inner bore with the sides of said jaws against said tapered inner bore, a drive stem screw-threadedly mounted in a tapped bore in the top of said chuck body, said drive stem having a bottom shoulder engaging the top of said jaw holder to move said jaw holder and jaws down and together to grasp a drill bit when said chuck body is turned up on said drive stem, and means for rotating said chuck body to loosen said jaws from grasping a drill bit, said means including a cylindrical collar rotatably mounted on said chuck body, a boss extending outward from said chuck body and a hammer lug extending inwardly from said collar for striking said boss to rotate said chuck body.

8. A drill chuck of the type having a collet and movable jaws therein for grasping the stem of a drill bit, a collar surrounding said collet, hammer means between said collar and collet for loosening said jaws when said collar is rotated, and spring means in said collar for actuating said hammer means.

9. In a drill chuck of the type having a collet and tightening members in the form of movable jaws therein, a spring actuated weight which may be wound and released to impart a hammer blow for releasing said tightening members.

10. In a drill chuck of the type having a collet and a plurality of axially movable work gripping members, a spring actuated weight which may be wound and released to impart a hammer blow to release said gripping members from grasping a work piece.

11. A chuck having movable jaws therein for grasping an object therebetween, a collar surrounding said chuck, hammer means, means to actuate said hammer means to open the jaws of said chuck by rotating said collar.

12. A chuck having a plurality of work gripping members movable inwardly toward a common axis, said members adapted to be outwardly movable from said common axis to release the same from gripping a work piece and a spring actuated weight which may be wound and released to impart a hammer blow for releasing said gripping members from grasping a work piece.

References Cited in the file of this patent
UNITED STATES PATENTS

| | | |
|---|---|---|
| 896,711 | Church | Aug. 25, 1908 |
| 2,591,287 | Pellar et al. | Apr. 1, 1952 |
| 2,693,966 | Chasar | Nov. 9, 1954 |
| 2,721,744 | Axelsson | Oct. 25, 1955 |